United States Patent Office 3,469,900
Patented Sept. 30, 1969

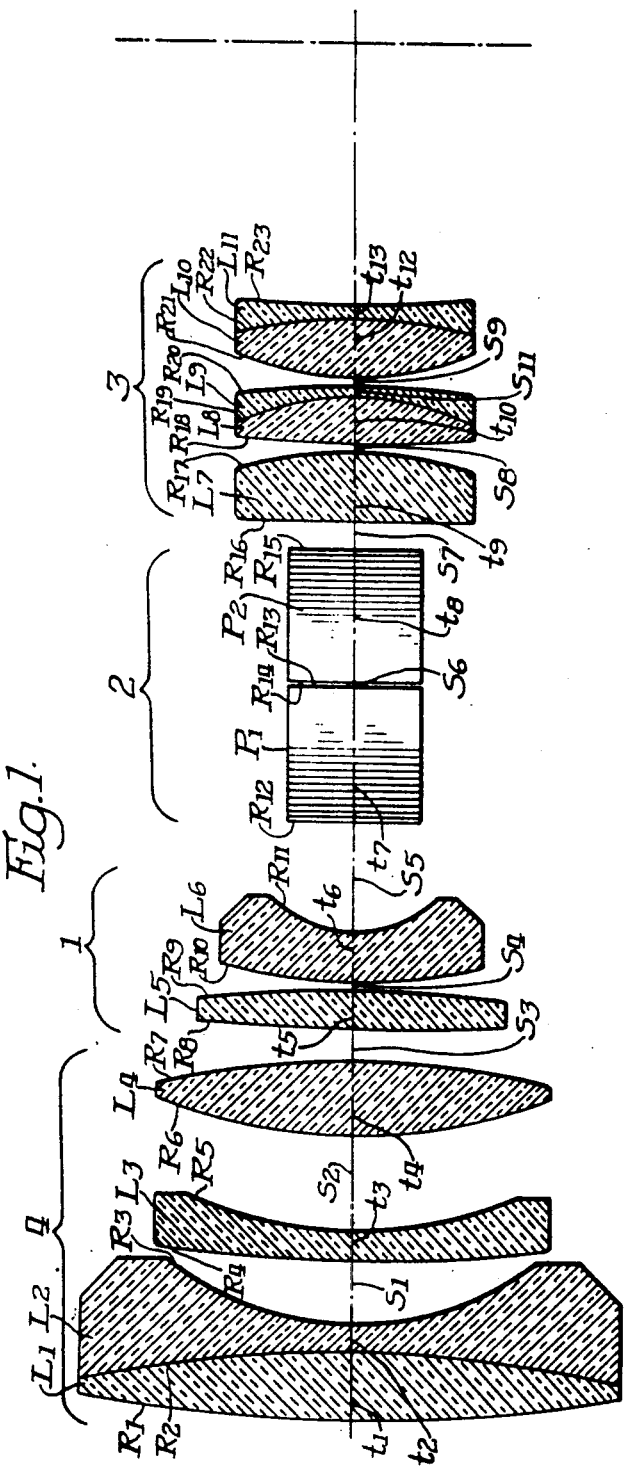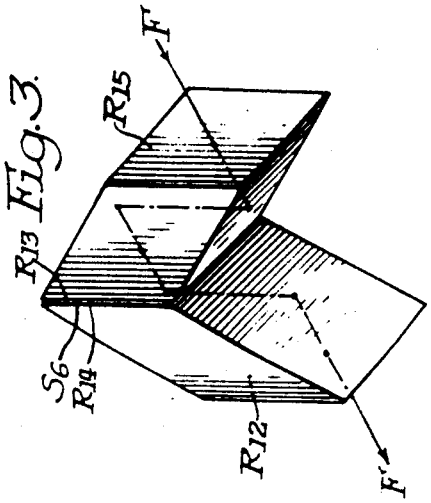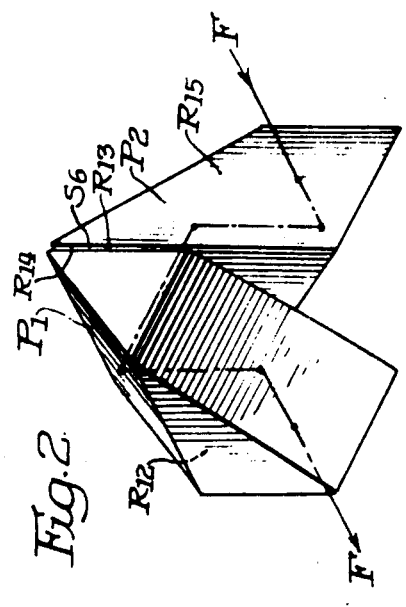

3,469,900
REVERSED TELEPHOTO TYPE LENS WITH INTERNAL PRISMS, AND WIDE-ANGLE ATTACHMENT THEREFOR
Jerome G. Kenney, Chicago, Ill., assignor to Bell & Howell Company, Chicago, Ill., a corporation of Illinois
Filed Oct. 6, 1967, Ser. No. 673,442
Int. Cl. G02b 17/04
U.S. Cl. 350—203     4 Claims

ABSTRACT OF THE DISCLOSURE

An optical projection objective for use in a system of motion picture projectors comprising a front negative group of lens elements, prism systems and a rear positive group of lens elements in optical alignment. All of the prism systems have the same optical thickness and a predetermined number of the prism systems embody an image orienting capability.

---

This invention relates to optical objectives of the reversed telephoto type and to wide-angle attachments for objectives.

The objects of this invention are to provide an improved $f/2.1$ objective of this type having an internal prism and to provide a wide angle attachment for converting it to an objective of shorter focal length at the option of the user.

Reflecting prisms associated with lens systems are well known, as in periscopes and binoculars. More closely related to the present invention are objectives with beam splitting prisms used in color photography and those with image inverting or rotating prisms used in projecting printed matter so that it is right side up and reads correctly from left to right.

It has long been known that for best results, an objective should be especially designed in conjunction with a prism that is to be inserted between it and its focal plane, since the prism has a considerable effect upon the aberrations of the image. I have found that the same is true when a prism is inserted between the negative front member and positive rear member of a reversed telephoto objective.

For purposes of optical design, the reflecting surfaces within the prism are ignored and the prism is "developed" as a block of glass with two plane surfaces and with a thickness corresponding to the length of path of the rays within the actual prism. Thus, the present invention is useful in several situations, such as projection onto a ceiling or rectifying printed matter, but in particular, it was developed for a plural projector system for motion pictures in which the film is to be passed through the film gate of one of the projectors from left to right and then through the gate of another of the projectors from right to left. One of the pictures must be rotated 180 degrees with respect to the other to appear right side up. For this purpose, I provide a system of two prisms in one projector for rotating the image, and I provide a pair of "dummy" prisms in the other projector which have substantially the same optical thickness but which do not rotate the image. By this means, lens systems which are otherwise identical are used in the two projectors and at the same time, the two projected pictures are properly oriented and are equally sharp.

According to one form of the invention, an optical projection objective is made up comprising a front negative member, an image-reorienting prism system and a rear positive member all in optical alignment, the optical thickness of the prism and the structure of the negative and positive members being substantially in accordance with Table I, below.

By "front" is meant the end of the objective facing the longer conjugate distance (the screen).

According to another form of the invention, a plurality of optical projection objectives are made up as above-described in some two of which the prisms are of substantially the same optical thickness and at the same time differ in their re-orienting of the image.

According to a special feature of the invention, a wide angle attachment is made up for each objective, constructed substantially in accordance with Table II, below, whereby at the user's option, a larger image may be projected upon a screen without increasing the throw.

In the accompanying drawings:

FIGURE 1 is a diagrammatic axial section of a projection lens according to the invention, with internal prisms and with a wide angle attachment mounted in operative position.

FIGURE 2 and FIGURE 3 are perspective views of two forms of prisms, one for projecting directly and one for rotating the image 180 degrees, in accordance with a special form of the invention.

In FIGURE 1, the reversed telephoto lens system consists of a front negative member 1, a prism 2 shown as two plane-parallel blocks of glass, and a rear positive member 3, all optically aligned in a mount, not shown. The radii of curvature $R_8$ to $R_{23}$ of the lens surfaces, the axial thicknesses $t_5$ to $t_{13}$ of the lens elements, the air spaces $s_4$ to $s_9$ between the lenses (sealed to a focal length of 1 inch), and the refractive indices $n$ for the sodium D line and conventional dispersion numbers V of the glasses are as set forth in the following table:

TABLE I
EF=1.0 inch    $f/2.1$

| | | | | |
|---|---|---|---|---|
| $L_5$ | $R_5=21.084$ | $t_5=0.314$ | $n=1.720$ | $V=29.3$ |
| | $R_9=7.420$ | $s_4=0.010$ | | |
| $L_6$ | $R_{10}=4.760$ | $t_6=0.360$ | $n=1.611$ | $V=58.8$ |
| | $R_{11}=0.900$ | $s_5=0.796$ | | |
| $P_1$ | $R_{12}=\infty$ | $t_7=2.000$ | $n=1.651$ | $V=55.8$ |
| | $R_{13}=\infty$ | $s_6=0.020$ | | |
| $P_2$ | $R_{14}=\infty$ | $t_8=2.000$ | $n=1.651$ | $V=55.8$ |
| | $R_{15}=\infty$ | $s_7=0.200$ | | |
| $L_7$ | $R_{16}=49.360$ | $t_9=0.540$ | $n=1.611$ | $V=58.8$ |
| | $R_{17}=-3.000$ | $s_8=0.010$ | | |
| $L_8$ | $R_{18}=8.002$ | $t_{10}=0.404$ | $n=1.620$ | $V=60.3$ |
| $L_9$ | $R_{19}=-1.789$ | $t_{11}=0.090$ | $n=1.720$ | $V=29.3$ |
| | $R_{20}=-5.401$ | $s_9=0.010$ | | |
| $L_{10}$ | $R_{21}=2.140$ | $t_{12}=0.450$ | $n=1.620$ | $V=60.3$ |
| $L_{11}$ | $R_{22}=-3.500$ | $t_{13}=0.090$ | $n=1.720$ | $V=29.3$ |
| | $R_{23}=15.980$ | | | |

Also shown in FIGURE 1 is a wide angle attachment 4 consisting of a front negative doublet, a negative element and a positive element mounted (at the user's option) in front of the front surface $R_8$ of the main lens.

The lens data are given in the following table in the same manner as above starting with subscript 1:

TABLE II
EF = infinity   Magnification = 0.70

| | | | | |
|---|---|---|---|---|
| $L_1$ | $R_1=12.540$ | $t_1=0.50$ | $n=1.751$ | $V=27.8$ |
| | $R_2=10.002$ | $t_2=0.20$ | $n=1.620$ | $V=60.3$ |
| $L_2$ | $R_3=2.220$ | $s_1=0.46$ | | |
| | $R_4=13.121$ | $t_3=0.22$ | $n=1.689$ | $V=30.9$ |
| $L_3$ | $R_5=3.228$ | $s_2=0.69$ | | |
| | $R_6=3.941$ | $t_4=0.56$ | $n=1.617$ | $V=55.1$ |
| $L_4$ | $R_7=6.154$ | $s_3=0.23$ | | |

| | | | | |
|---|---|---|---|---|
| $L_5$ | $R_8=21.084$ | $t_5=0.314$ | $n=1.720$ | $V=29.3$ |
| | $R_9=7.420$ | $s_4=0.010$ | | |
| $L_6$ | $R_{10}=4.760$ | $t_6=0.360$ | $n=1.611$ | $V=58.8$ |
| | $R_{11}=0.900$ | $s_5=0.796$ | | |
| $P_1$ | $R_{12}=\infty$ | $t_7=2.000$ | $n=1.651$ | $V=55.8$ |
| | $R_{13}=\infty$ | $s_6=0.020$ | | |
| $P_2$ | $R_{14}=\infty$ | $t_8=2.000$ | $n=1.651$ | $V=55.8$ |
| | $R_{15}=\infty$ | $s_7=0.200$ | | |
| $L_7$ | $R_{16}=49.360$ | $t_9=0.540$ | $n=1.611$ | $V=58.8$ |
| | $R_{17}=-3.000$ | $s_8=0.010$ | | |
| $L_8$ | $R_{18}=8.002$ | $t_{10}=0.404$ | $n=1.620$ | $V=60.3$ |
| $L_9$ | $R_{19}=-1.789$ | $t_{11}=0.090$ | $n=1.720$ | $V=29.3$ |
| | $R_{20}=-5.401$ | $s_9=0.010$ | | |
| $L_{10}$ | $R_{21}=2.140$ | $t_{12}=0.450$ | $n=1.620$ | $V=60.3$ |
| | $R_{22}=-3.500$ | | | |
| $L_{11}$ | $R_{23}=15.980$ | $t_{13}=0.090$ | $n=1.720$ | $V=29.3$ |

FIGURE 2 is a diagrammatic perspective view of an erecting prism represented by the two blocks of glass $P_1$ and $P_2$ in FIGURE 1. This is a conventional poro prism of the second type as used in some prism telescopes. It is made in two pieces separated by a small space $s_6$, and the aperture stop of the lens system is located in this space.

FIGURE 3 is a similar perspective view of a prism which has the same optical thickness as the prism of FIGURE 2 but which does not rotate or reverse the image.

By making up two lens systems, one with the prism of FIGURE 2 and one with the prism of FIGURE 3, I provide lenses for two motion picture projectors which operate with the film passing in opposite relative directions through the gate. In a particular form of the invention, two or more projector units are arranged substantially in two rows in the overhead racks on two sides of an aisle of an airplane. The film passes serially through one after another of the projectors on one side of the aisle, crosses the aisle, and then passes through the projectors on the other side of the aisle. The projectors are arranged to project onto black-lighted screens suspended from the underside of the overhead rack.

The lens system as designed and as shown herein is also useful made up with other known types of prisms such as beam-splitters and inverting prisms. For example, it is useful in projecting printed matter to provide interchangeable prisms so that the printed matter can be made to read forward or backward as needed in each case.

What is claimed is:

1. A projection lens comprising a front group of lens elements, a rear group of lens elements and an image-orienting prism system therebetween and constructed in substantial compliance with the following table in which dimensions are in terms of the focal length, and proceeding from front to rear, $L_5$ to $L_{11}$ designate the lens elements, $P_1$ to $P_2$ the prisms, $R_8$ to $R_{23}$ the radii of curvature of the surfaces, $t_5$ to $t_{13}$ the axial thicknesses, $s_4$ to $s_9$ the axial separations, and $n$ and $V$ the conventional refractive indices for sodium D and the dispersion numbers: the lenses being mounted in optical axial alignment and the designated thickness of each prism being as measured along the path of the optical axis through the prism.

2. A projection system comprising at least two projectors each having a projection lens system according to claim 1 and each having a film gate, in which the two image re-orienting prisms differ in configuration in a predetermined manner whereby one projector is adapted to receive film in one predetermined orientation and the other projector is adapted to receive film in another predetermined orientation and both are adapted to project a correctly oriented picture.

3. A projection system according to claim 2 in which the said predetermined orientations differ by a rotation of 180 degrees about the optical axis.

4. A projection lens according to claim 1 having mounted in axial alignment in front of it a wide angle attachment constructed in substantial compliance with the following table in which $L_1$ to $L_4$ designate lens elements, $R_1$ to $R_7$ the radii of curvature of the surfaces, $t_1$ to $t_4$ the thicknesses, $s_1$ to $s_3$ the axial separations, and $n$ and $V$ as in claim 1:

| | | | | |
|---|---|---|---|---|
| $L_1$ | $R_1=12.540$ | $t_1=0.50$ | $n=1.751$ | $V=27.8$ |
| | $R_2=10.002$ | $t_2=0.20$ | $n=1.620$ | $V=60.3$ |
| $L_2$ | $R_3=2.220$ | $s_1=0.46$ | | |
| | $R_4=13.121$ | $t_3=0.22$ | $n=1.689$ | $V=30.9$ |
| $L_3$ | $R_5=3.228$ | $s_2=0.69$ | | |
| | $R_6=3.941$ | $t_4=0.56$ | $n=1.617$ | $V=55.1$ |
| $L_4$ | $R_7=6.154$ | $s_3=0.23$ | | |

References Cited

UNITED STATES PATENTS

Re. 17,995   3/1931   Mitchell.
1,955,590   4/1934   Lee.

FOREIGN PATENTS 434,788   10/1969   Switzerland.

DAVID SCHONBERG, Primary Examiner

MICHAEL J. TOKAR, Assistant Examiner